United States Patent
Yang et al.

(10) Patent No.: US 9,846,252 B2
(45) Date of Patent: Dec. 19, 2017

(54) PROXIMITY SENSOR AND MOBILE COMMUNICATION DEVICE THEREOF

(71) Applicant: ASUSTeK COMPUTER INC., Taipei (TW)

(72) Inventors: Chen-Min Yang, Taipei (TW); Chun-Chieh Lin, Taipei (TW); Tsung-Hsun Hsieh, Taipei (TW); Wen-Hsin Lin, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 9 days.

(21) Appl. No.: 15/054,063

(22) Filed: Feb. 25, 2016

(65) Prior Publication Data
US 2017/0248725 A1    Aug. 31, 2017

(51) Int. Cl.
*G01V 3/08*    (2006.01)

(52) U.S. Cl.
CPC ................... *G01V 3/08* (2013.01)

(58) Field of Classification Search
CPC combination set(s) only.
See application file for complete search history.

(56) References Cited

U.S. PATENT DOCUMENTS

| | | | |
|---|---|---|---|
| 2012/0154245 A1 | 6/2012 | Nagumo et al. | |
| 2012/0214422 A1* | 8/2012 | Shi | H04B 1/3838 455/67.11 |
| 2014/0333494 A1* | 11/2014 | Huang | H01Q 1/002 343/720 |
| 2015/0171916 A1* | 6/2015 | Asrani | H04B 1/68 455/575.7 |

FOREIGN PATENT DOCUMENTS

| | | |
|---|---|---|
| CN | 102484316 | 5/2012 |
| CN | 202817169 | 3/2013 |

* cited by examiner

*Primary Examiner* — Clayton E Laballe
*Assistant Examiner* — Jas Sanghera
(74) *Attorney, Agent, or Firm* — JCIPRNET

(57) ABSTRACT

A proximity sensor and a mobile communication device thereof are provided. The mobile communication device includes an antenna structure, a matching circuit, a capacitance sensing circuit and a processing circuit. The matching circuit couples to the antenna structure. The capacitance sensing circuit couples to the matching circuit. The capacitance sensing circuit senses a capacitance variation on the antenna structure via the matching circuit and accordingly generates a proximity sensing signal. The processing circuit is coupled to the capacitance sensing circuit to receive the proximity sensing signal. When a signal level of the proximity sensing signal exceeds a first threshold value, an object is determined approaching, and when the signal level of the proximity sensing signal exceeds a second threshold value, a human body is determines approaching. The first and the second threshold value are different.

20 Claims, 6 Drawing Sheets

PROXIMITY SENSOR AND MOBILE COMMUNICATION DEVICE THEREOF

BACKGROUND OF THE INVENTION

Field of the Invention

The invention relates to a proximity sensor and particularly to a proximity sensor using the antenna structure as a sensing conductor and a mobile communication device thereof.

Description of Related Art

Mobile communication devices, such as mobile phones, personal digital assistants (PDAs) and tablets have become extremely popular and for many users are considered indispensable.

One of the most important components of mobile communication devices are their antennas, which are configured to radiate and receive electromagnetic waves so as to transmit and exchange wireless information between the mobile communication device and other devices.

Generally speaking, electromagnetic waves radiated by an antenna may often be harmful to human health, so that the Federal Communications Commission (FCC) specifies a specific absorption ratio (SAR) for electronic apparatus to limit radiation energy of the electronic apparatus or to define a maximum radiation limit for the electronic apparatus.

In order to make the SAR value to comply with a test specification, in the conventional electronic apparatus, sensing antennas are configured to both ends of a communication antenna, and sensors are used in collaboration with the sensing antennas to detect a distance between the electronic apparatus and human body, so as to determine whether or not to decrease a radiation power of the communication antenna, and maintain the SAR value within a safe test range.

SUMMARY OF THE INVENTION

In one aspect of the disclosure, a mobile communication device, comprising: an antenna structure; a matching circuit, coupled to the antenna structure; a capacitance sensing circuit, coupled to the matching circuit, wherein the capacitance sensing circuit senses a capacitance variation on the antenna structure via the matching circuit and accordingly generates a proximity sensing signal; and a processing circuit, coupled to the capacitance sensing circuit to receive the proximity sensing signal, wherein when a signal level of the proximity sensing signal exceeds a first threshold value, an object is determined approaching, and when the signal level of the proximity sensing signal exceeds a second threshold value, a human body is determines approaching, wherein the first and the second threshold value are different.

In another aspect of the disclosure, a proximity sensor suitable for disposing in a mobile communication device, wherein the mobile communication device comprises an antenna structure for receiving or emitting a wireless communication signal, the proximity sensor comprising: a matching circuit, coupled to the antenna structure; and a capacitance sensing circuit, taking the antenna structure as a sensing conductor to sense a capacitance variation on the antenna structure and accordingly generate a proximity sensing signal, wherein a signal level of the proximity sensing signal is calculated, the object is determined to be approaching the mobile communication device when the signal level of the proximity sensing signal exceeds a first threshold value, and the approaching object is determined to be the human body when the signal level of the proximity sensing signal exceeds a second threshold value, wherein the first and the second threshold are different.

According to the above descriptions, the embodiments of the disclosure provide a proximity sensor and a mobile communication device thereof. The proximity sensor takes the antenna structure as a sensing conductor, which replaces the copper foil of the traditional proximity sensor, and thus the area of the layout design of the mobile communication device can be saved since the individual sensing conductor can be trimmed. Further, the mobile communication device may distinguish whether the approaching object is the human body by observing the relative difference between the proximity sensing signal and different threshold values, so that the mobile communication device can reduce the emitting power of the transceiver only when the user is actually holding the mobile communication device.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
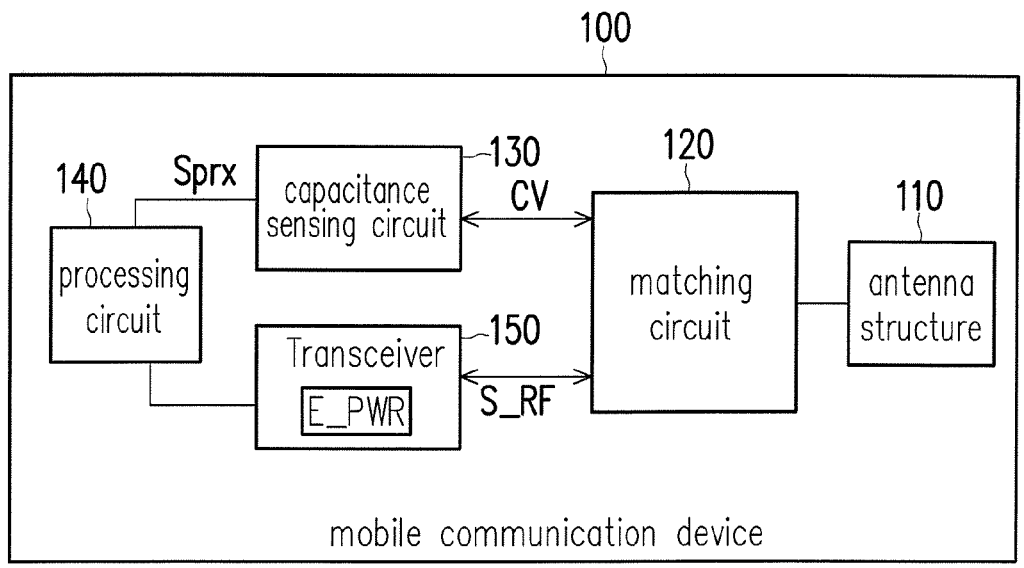
FIG. 1 is a functional block diagram of a mobile communication device according to an embodiment.

Reference will now be made in detail to the present preferred embodiments of the disclosure, examples of which are illustrated in the accompanying drawings. Wherever possible, the same reference numbers are used in the drawings and the description to refer to the same or like parts.

In the disclosure, a term "couple" refers to directly connect, indirectly connect, or integrate with an object. For example, if it is described that a first device is coupled to a second device, it can be implemented that the first device is directly connected to the second device, indirectly connected to the second device through other devices or a certain connection means, and it can also be implemented that the first device is integrated with the second device.

Figure 2:
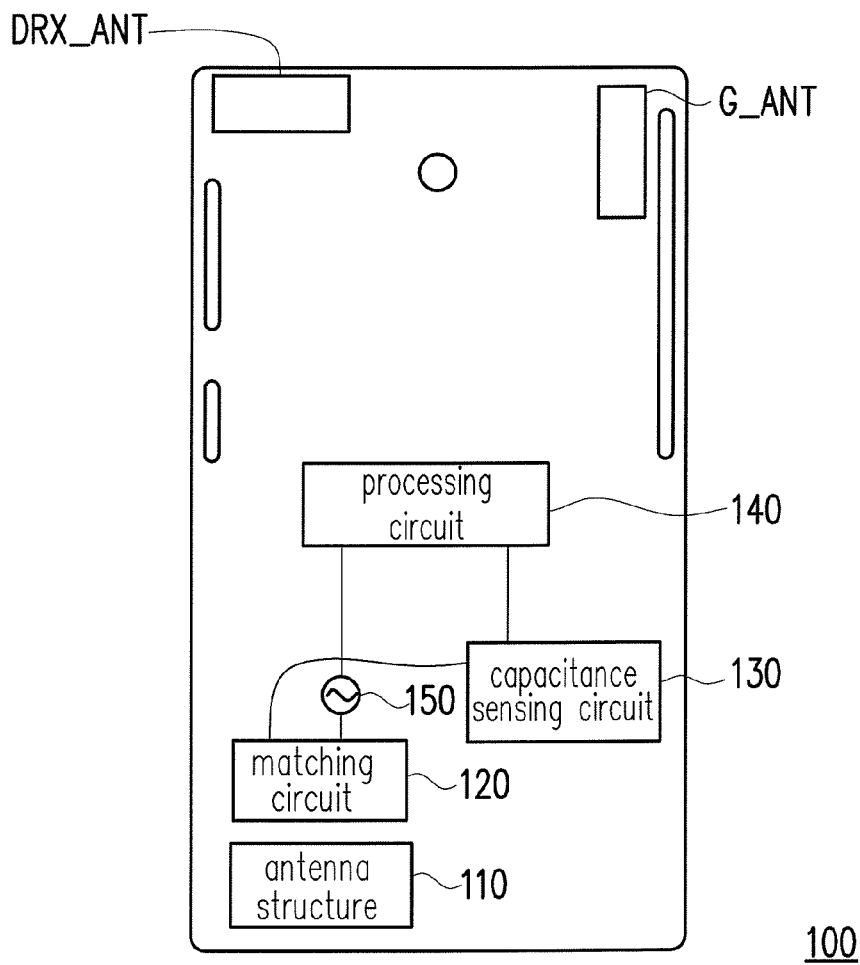
FIG. 2 is a structure schematic diagram of the mobile communication device according to an embodiment.

FIG. 1 is a functional block diagram of a mobile communication device according to an embodiment. FIG. 2 is a structure schematic diagram of the mobile communication device according to an embodiment.

Referring to FIG. 1 and FIG. 2, the mobile communication device 100 includes an antenna structure 110, a matching circuit 120, a capacitance sensing circuit 130, a processing circuit 140, and a transceiver 150.

The antenna structure 110 may disposed on the edge of the substrate in the mobile communication device, in which the antenna structure 110 can be implemented by the coupling antenna structure or the planar inverted F-antenna (PIFA) structure, the disclosure is not limited thereto.

The matching circuit 120 is coupled to the antenna structure 110 and configured to adjust the characteristics of the impedance matching between the circuit components and the external signal.

The capacitance sensing circuit 130 is coupled to the matching circuit 120. In the present embodiment, the capacitance sensing circuit 130 senses capacitance variation on the antenna structure 110 via the matching circuit 120 and accordingly generates a proximity sensing signal Sprx indicating the capacitance variation.

The processing circuit 140 is hardware (e.g., a chipset, a processor and set forth) having computing capability for controlling the entire operation of the mobile communication device 100. In the present exemplary embodiment, the processing circuit 140 is, for example, a central processing unit (CPU) or any other programmable microprocessor or digital signal processor (DSP), programmable controller, application specific integrated circuits (ASIC), programmable logic device (PLD) or the like. The processing circuit 140 is coupled to the capacitance sensing circuit 130 to receive the proximity sensing signal Sprx and coupled to the transceiver 150 to control the emitting power E_PWR of the transceiver 150.

Transceiver 150 is coupled to the matching circuit 120 and the processing circuit 140 and providing a wireless communication signal S_RF to the antenna structure 110 via the matching circuit 120.

To be specific, in the present embodiment, the matching circuit 120 and the capacitance sensing circuit 130 constitute a proximity sensor PRXS, in which the capacitance sensing circuit 130 of the proximity sensor PRXS takes the antenna structure 110 as a sensing conductor, which replaces the copper foil of the traditional proximity sensor, and thus the area of the layout design of the mobile communication device 100 can be saved since the individual sensing conductor can be trimmed.

It should be noted that, since the mobile communication device 100 may further include, in the practical application, the diversity receive antenna DRX_ANT and the GPS antenna G_ANT, although the proximity sensor PRXS of the present embodiment is illustrated to apply to the main antenna/RF antenna (i.e., antenna structure 110), but it also can utilize in the other antenna, the disclosure is not limited thereto.

In view of operation of the mobile communication device 100, the processing circuit 140 may determine whether an object is approaching the mobile communication device according to the proximity sensing signal Sprx. Therefore, the processing circuit 140 may reduce the emitting power E_PWR when a user is holding and using the mobile communication device 100, so as to avoid the radio harm the human body.

Figure 3:
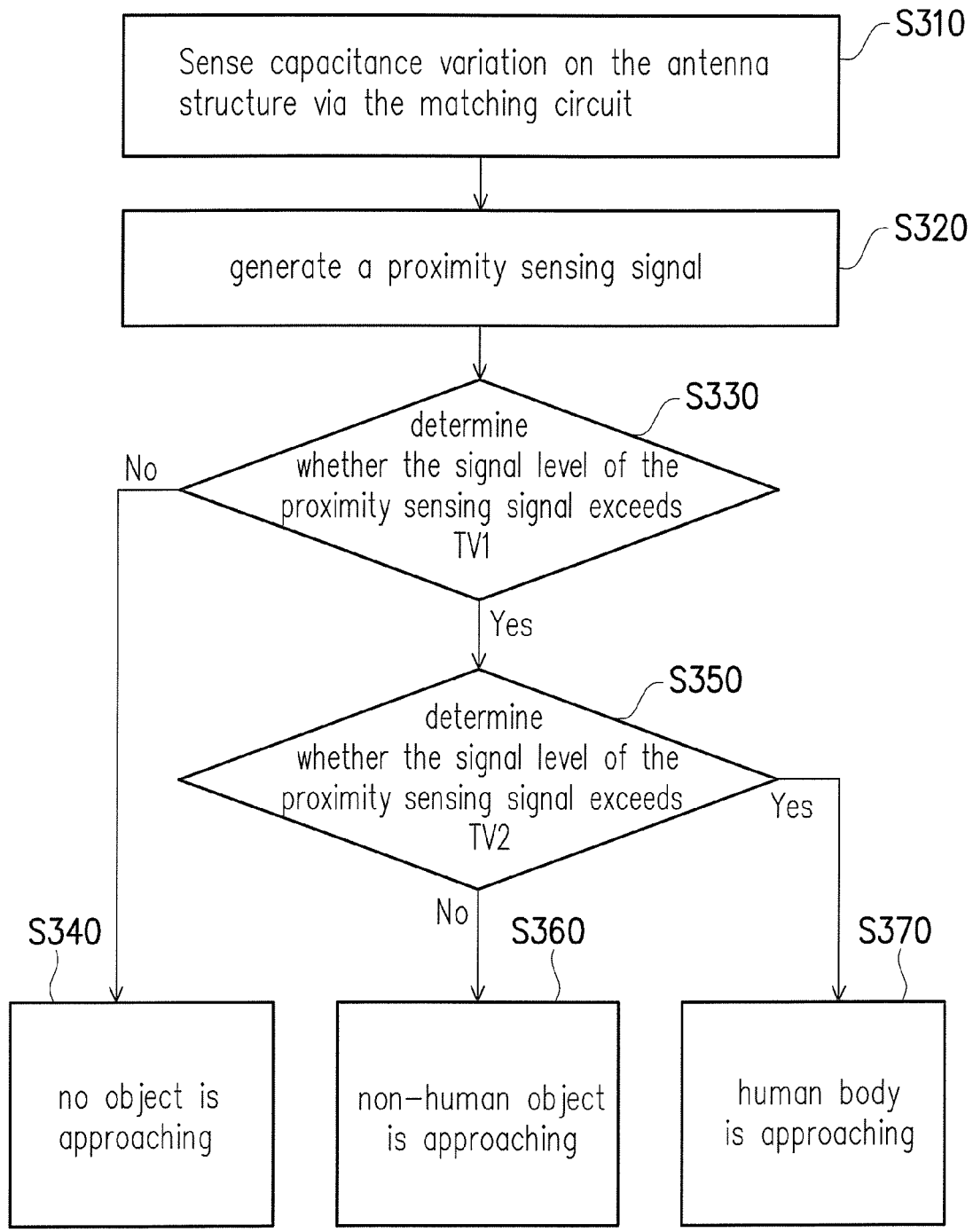
FIG. 3 is a schematic flowchart illustrating a process of determining whether the human body is approaching the mobile communication device according to an embodiment.

To be specific, since the human body and the non-human object may induce different capacitance variations, the present embodiment provides a method, as shown in FIG. 3, for distinguishing whether the approaching object is the human body or the non-human object by observing the relative difference between the proximity sensing signal and different threshold values.

Referring to FIG. 1 and FIG. 3, the capacitance sensing circuit 130 firstly sense the capacitance variation CV on the antenna structure 110 via the matching circuit 120 (step S310) and then generate a proximity sensing signal Sprx, accordingly (step S320).

After the proximity sensing signal Sprx has been generated, the processing circuit 140 may determine whether the signal level of the proximity sensing signal Sprx exceeds a threshold value TV1 (step S330).

If the processing circuit 140 determines the signal level of the proximity sensing signal Sprx does not exceed the threshold value TV1, the processing circuit 140 may determine that there is no object approaching (step S340). On the contrary, if the processing circuit 140 determines the signal level of the proximity sensing signal Sprx exceeds the threshold value TV1, the processing circuit 140 may further determine whether the signal level of the proximity sensing signal Sprx exceeds threshold value TV2 (S350), where the absolute value of the threshold value TV2 is larger than the absolute value of the threshold value TV1.

If the processing circuit 140 determines the signal level of the proximity sensing signal Sprx exceeds the threshold value TV1 but does not exceed the threshold value TV2, the processing circuit 140 may determine that a non-human object is approaching (step S360). On the contrary, if the processing circuit 140 determines the signal level of the proximity sensing signal Sprx exceeds the threshold value TV2, the processing circuit 140 may determine that a human body is approaching (step S370).

In other words, when the signal level of the proximity sensing signal Sprx is located within the range between the threshold values TV1 and TV2, although the capacitance on the antenna structure 110 is varied, the approaching object still not be determined as the human body. That is, only when the signal level of the proximity sensing signal Sprx exceeds the threshold value TV2, the approaching object may be determined as the human body.

Accordingly, the processing circuit 140 may perform different operations due to the different conditions, so as to control the circuit operation behavior with more accuracy. In an embodiment, the processing circuit 140 may reduce the emitting power E_PWR of the transceiver 150 only when the processing circuit 140 determines the approaching object is the human body, but maintains the emitting power E_PWR of the transceiver 150 when the processing circuit 140 determines the approaching object is not the human body.

Figure 4:
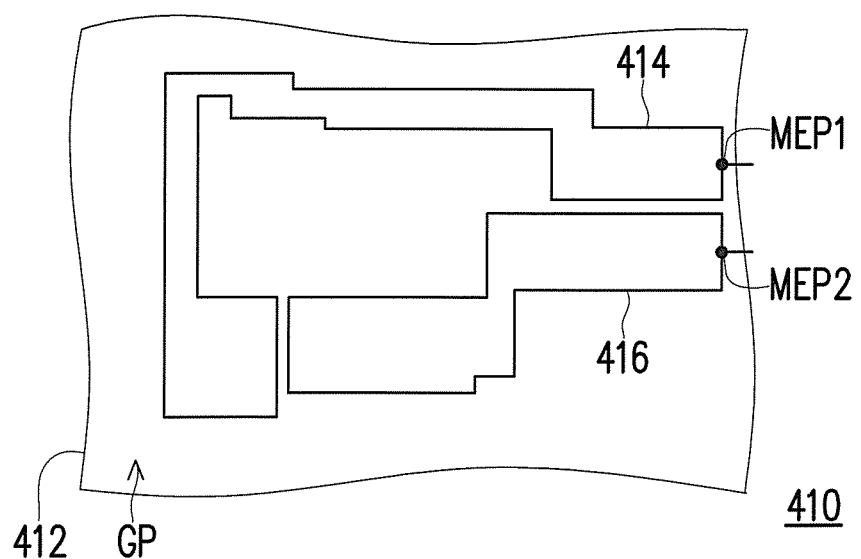
FIG. 4 is a structure schematic diagram of an antenna structure according to an embodiment.

FIG. 4 is a structure schematic diagram of an antenna structure according to an embodiment of the disclosure. Referring to FIG. 4, taking a coupling antenna structure for example (hereinafter the coupling antenna structure 410). The coupling antenna structure 410 includes a carrier 412, a first metal element 414 and a second metal element 416.

The carrier 412 can be implemented by a substrate, in which the carrier is, in embodiments, a plastic back cover, a plastic front cover, or a speaker, and the substrate is, in an embodiments, a printed circuit board (PCB) or a non-conductive plastic. The first metal element 414 is disposed on the carrier 412 and has a first metal element point MEP1 and is connected to a ground plane GP. The second metal element 416 is disposed on the carrier 412 and has a second metal element point MEP2 and is connected to a signal source such as a transceiver, in which the second metal element 416 and the first metal element 414 are spaced apart by a coupling distance. The first metal element point MEP1 conducts to the ground plan GP through a cable, a pogo pin, or a spring and the second metal element point MEP2 conducts to the signal source through a cable, a pogo pin, or a shrapnel.

It should be noted that, the coupling antenna structure 410 illustrating in FIG. 4 is merely an exemplary embodiment, the coupling antenna structure with different pattern may also be applied in the present embodiment, and the disclosure is not limited thereto.

Figure 5A:
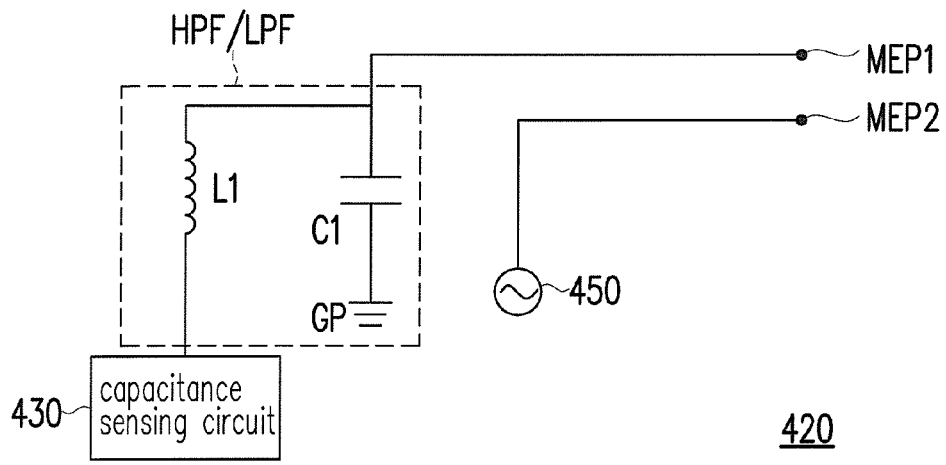
FIG. 5A to FIG. 5C are structure schematic diagrams illustrating a matching circuit according to the embodiment in FIG. 4.
Figure 5B:
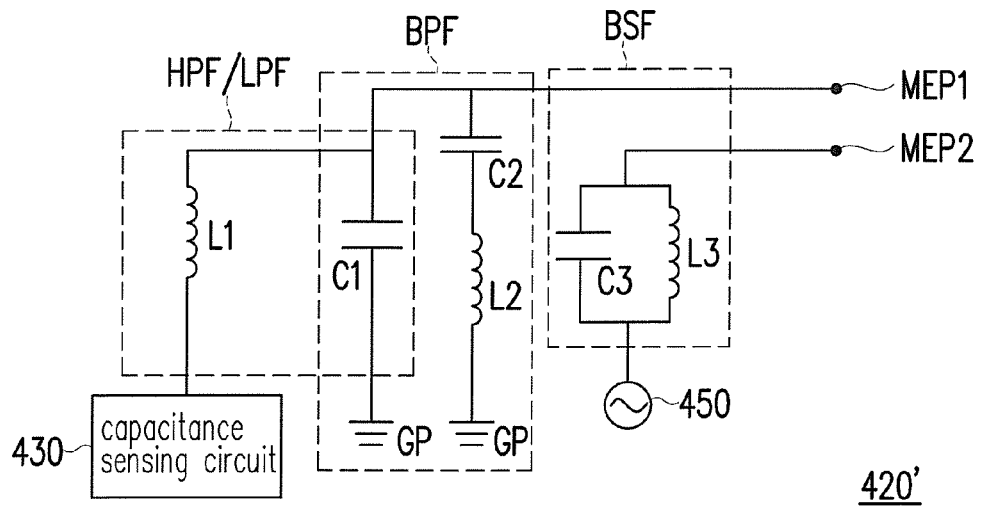
Figure 5C:
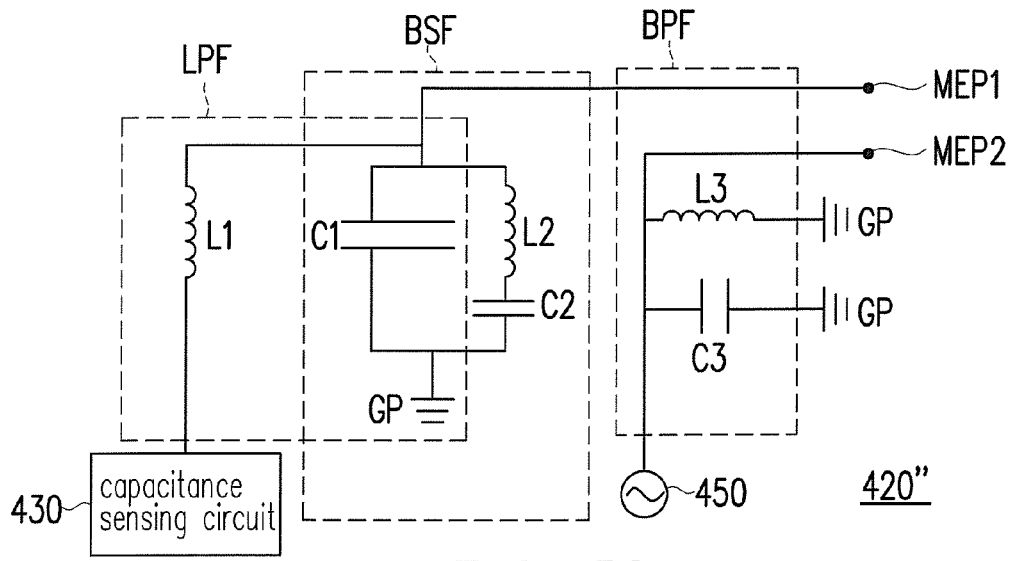

There are several embodiments of the matching circuit, which can be applied with the coupling antenna structure 410 illustrating in FIG. 4, may be described below. FIG. 5A to FIG. 5C are structure schematic diagrams illustrating a matching circuit according to the embodiment in FIG. 4.

Referring to FIG. 5A, the transceiver 450 is directly connected to the second metal element point MEP2 and the matching circuit 420 includes a capacitor C1 and an inductor L1. The first terminal of the capacitor C1 is connected to the first metal element point MEP1 of the coupling antenna 410. The second terminal of the capacitor C1 is connected to the ground plane GP. The first terminal of the inductor L1 is connected to the first terminal of the capacitor C1. The second terminal of the inductor L1 is connected to the capacitance sensing circuit 430. In the present embodiment, the capacitor C1 and the inductor L1 may constitute a high pass filter HPF or a low pass filter LPF, so as to transmit the low frequency signal to the capacitance sensing circuit 430 and transmit the high frequency signal to the coupling antenna structure 410.

Referring to FIG. 5B, the matching circuit 420' includes capacitors C1 to C3 and inductors L1 to L3. The first terminal of the capacitor C1 is connected to the first metal element point MEP1 of the coupling antenna 410. The second terminal of the capacitor C1 is connected to the ground plane GP. The first terminal of the inductor L1 is connected to the first terminal of the capacitor C1. The second terminal of the inductor L1 is connected to the capacitance sensing circuit 430. In the present embodiment, the capacitor C1 and the inductor L1 may constitute a high pass filter HPF or a low pass filter LPF.

The first terminal of the capacitor C2 is connected to the first terminal of the capacitor C1. The first terminal of the inductor L2 is connected to the second terminal of the capacitor C2. That is, the capacitor C2 and the inductor L2 are connected in series between the first feeding point FP1 and the ground plane GP. In the present embodiment, the capacitors C1 and C2 and the inductor L2 may constitute a band-pass filter BPF.

The first terminal of the capacitor C3 is connected to the second metal element point MEP2. The second terminal of the capacitor C3 is connected to the transceiver 450. The first terminal of the inductor L3 is connected to the first terminal of the capacitor C3. The second terminal of the inductor L3 is connected to the second terminal of the capacitor C3. That is, the capacitor C3 and the inductor L3 are connected in parallel between the second metal element point MEP2 and the transceiver 450. In the present embodiment, the capacitor C3 and the inductor L3 may constitute a band-stop filter BSF.

Referring to FIG. 5C, the matching circuit 420" includes capacitors C1 to C3 and inductors L1 to L3. The first terminal of the capacitor C1 is connected to the first metal element point MEP1 of the coupling antenna 410. The second terminal of the capacitor C1 is connected to the ground plane GP. The first terminal of the inductor L1 is connected to the first terminal of the capacitor C1. The second terminal of the inductor L1 is connected to the capacitance sensing circuit 430. In the present embodiment, the capacitor C1 and the inductor L1 may constitute a low pass filter LPF.

The first terminal of the inductor L2 is connected to the first terminal of the capacitor C1 and the first terminal of the inductor L1. The first terminal of the capacitor C2 is connected to the second terminal of the inductor L2. The second terminal of the capacitor C2 is connected to the ground plane. That is, the capacitor C2 and the inductor L2 are connected in series between the first metal element point MEP1 and are connected to the ground plane GP. In the present embodiment, the capacitors C1 and C2 and the inductor L2 may constitute a band-stop filter BSF.

The first terminal of the capacitor C3 is connected to the second metal element point MEP2 and the transceiver 450. The second terminal of the capacitor C3 is connected to the ground plane GP. The first terminal of the inductor L3 is connected to the first terminal of the capacitor C3. The second terminal of the inductor L3 is connected to the ground plane GP. That is the capacitor C3 and the inductor L3 are connected in parallel between the second metal element point MEP2 and the ground plane GP. In the present embodiment, the capacitor C3 and the inductor L3 may constitute a band-pass filter BPF.

Figure 6:
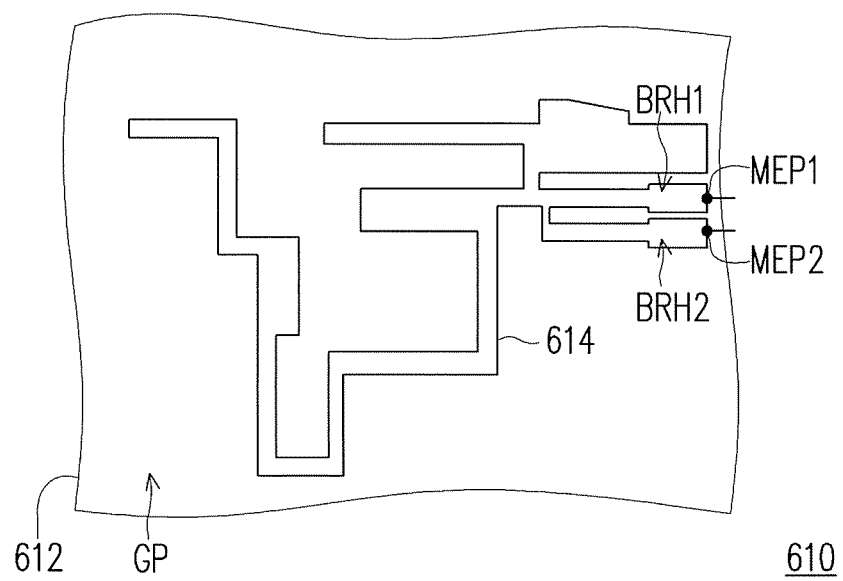
FIG. 6 is a structure schematic diagram of an antenna structure according to another embodiment.

FIG. 6 is a structure schematic diagram of an antenna structure according to another embodiment of the disclosure. Referring to FIG. 6, the antenna structure 610 is taking a PIFA structure for example (hereinafter the PIFA structure 610). The PIFA structure 610 includes a carrier 612 and a metal element 614.

The carrier 612 can be implemented by a substrate, in which the carrier is, in an embodiment, a plastic back cover, a plastic front cover, or a speaker, and the substrate is, in an embodiment, a printed circuit board (PCB) or a non-conductive plastic. The metal element 614 is disposed on the carrier 612 and has a first branch BRH1 and a second branch BRH2, in which the first branch BRH1 has a first metal element point MEP1 and is connected to a ground plan GP and the second branch BRH2 has a second metal element point MEP2. The first metal element point MEP1 conducts to the ground plan GP through a cable, a pogo pin, or a spring and the second metal element point MEP2 conducts to the signal source through a cable, a pogo pin, or a spring.

It should be noted that, the PIFA structure 610 illustrating in FIG. 6 is merely an exemplary embodiment, the PIFA structure with different pattern also can be applied in the present embodiment, and the disclosure is not limited thereto.

Figure 7A:
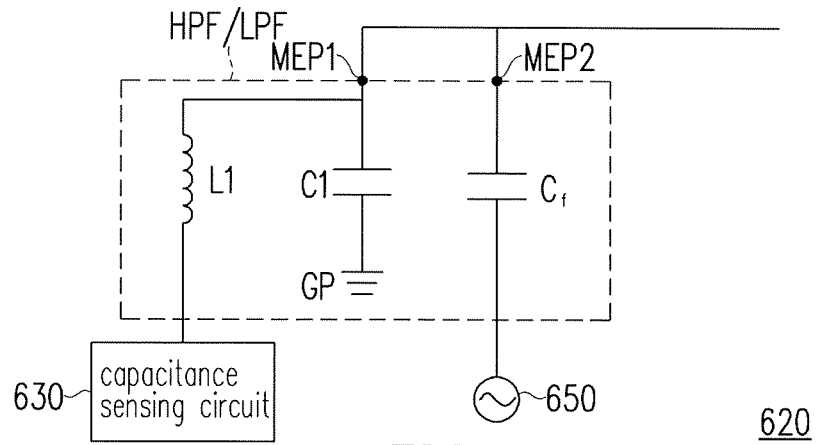
FIG. 7A to FIG. 7C are structure schematic diagrams illustrating a matching circuit according to the embodiment in FIG. 6.
Figure 7B:
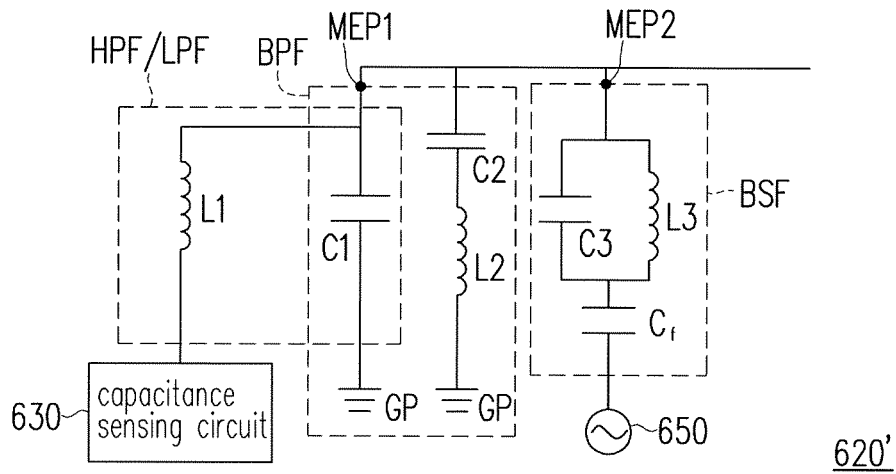
Figure 7C:
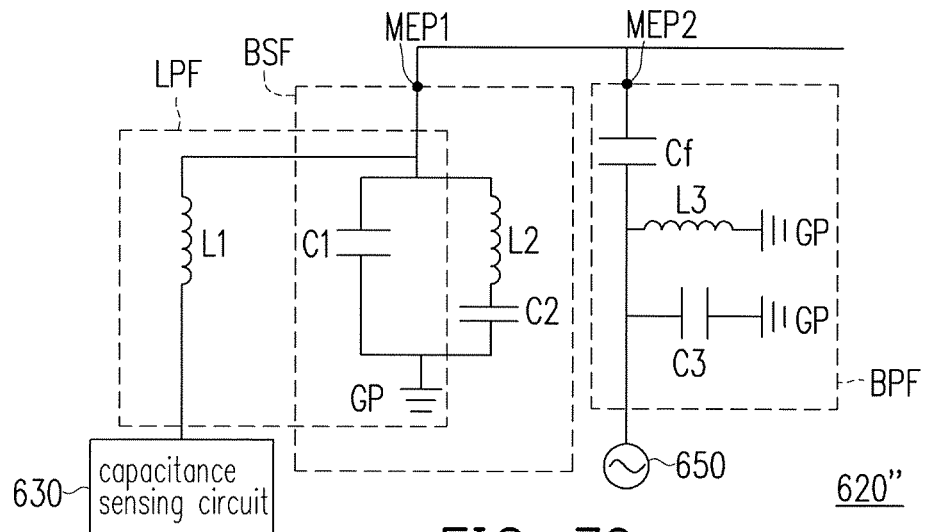

There are several embodiments of the matching circuit, which can be applied with the PIFA structure 610 illustrating in FIG. 6, may be described below. FIG. 7A to FIG. 7C are structure schematic diagrams illustrating a matching circuit according to the embodiment in FIG. 6.

Referring to FIG. 7A, the matching circuit 620 includes a capacitor C1, a feeding capacitor $C_f$ and an inductor L1. The first terminal of the capacitor C1 is connected to the first metal element point MEP1 of the PIFA structure 610. The second terminal of the capacitor C1 is connected to the ground plane GP. The first terminal of the inductor L1 is connected to the first terminal of the capacitor C1. The second terminal of the inductor L1 is connected to the capacitance sensing circuit 630. The first terminal of the feeding capacitor $C_f$ is connected to the second metal element point MEP2. The second terminal of the feeding capacitor $C_f$ is connected to the transceiver 650. In the present embodiment, the capacitor C1, the feeding capacitor $C_f$ and the inductor L1 may constitute a high pass filter HPF or a low pass filter LPF, so as to transmit the low frequency signal to the capacitance sensing circuit 630 and transmit the high frequency signal to the PIFA structure 610.

Referring to FIG. 7B, the matching circuit 620' includes capacitors C1 to C3, a feeding capacitor $C_f$ and inductors L1 to L3. The first terminal of the capacitor C1 is connected to the first metal element point MEP1 of the PIFA antenna 610. The second terminal of the capacitor C1 is connected to the ground plane GP. The first terminal of the inductor L1 is connected to the first terminal of the capacitor C1. The second terminal of the inductor L1 is connected to the capacitance sensing circuit 630. In the present embodiment, the capacitor C1 and the inductor L1 may constitute a high pass filter HPF or a low pass filter LPF.

The first terminal of the capacitor C2 is connected to the first terminal of the capacitor C1. The first terminal of the inductor L2 is connected to the second terminal of the capacitor C2. That is, the capacitor C2 and the inductor L2 are connected in series between the first metal element point MEP1 and the ground plane GP. In the present embodiment, the capacitors C1 and C2 and the inductor L2 may constitute a band-pass filter BPF.

The first terminal of the capacitor C3 is connected to the second metal element point MEP2. The first terminal of the feeding capacitor $C_f$ is connected to the second terminal of the capacitor C3. The second terminal of the feeding capacitor $C_f$ is connected to the transceiver 650. The first terminal of the inductor L3 is connected to the first terminal of the capacitor C3. The second terminal of the inductor L3 is connected to the second terminal of the capacitor C3 and the first terminal of the feeding capacitor $C_f$. In the present embodiment, the capacitor C3, the feeding capacitor $C_f$ and the inductor L3 constitute a band-stop filter BSF.

Referring to FIG. 7C, the matching circuit 620" includes capacitors C1 to C3, a feeding capacitor $C_f$ and inductors L1 to L3. The first terminal of the capacitor C1 is connected to the first metal element point MEP1 of the PIFA structure 610. The second terminal of the capacitor C1 is connected to the ground plane GP. The first terminal of the inductor L1 is connected to the first terminal of the capacitor C1. The second terminal of the inductor L1 is connected to the capacitance sensing circuit 630. In the present embodiment, the capacitor C1 and the inductor L1 may constitute a high pass filter HPF or a low pass filter LPF.

The first terminal of the inductor L2 is connected to the first terminal of the capacitor C1 and the first terminal of the inductor L1. The first terminal of the capacitor C2 is connected to the second terminal of the inductor L2. The second terminal of the capacitor C2 is connected to the ground plane. That is, the capacitor C2 and the inductor L2 are connected in series and are connected to the ground plane GP. In the present embodiment, the capacitors C1 and C2 and the inductor L2 may constitute a band-stop filter BSF.

The first terminal of the capacitor C3 is connected to the transceiver 650. The second terminal of the capacitor is connected to the ground plane GP. The first terminal of the feeding capacitor $C_f$ is connected to the second metal element point MEP2. The second terminal of the feeding capacitor $C_f$ is connected to the first terminal of the capacitor C3 and the transceiver 650. The first terminal of the inductor L3 is connected to the first terminal of the capacitor C3 and the second terminal of the feeding capacitor $C_f$. The second terminal of the inductor L3 is connected to the ground plane GP. In the present embodiment, the capacitor C3, the feeding capacitor $C_f$ and the inductor L3 constitute a band-pass filter BPF.

To sum up, the embodiments of the disclosure provide a proximity sensor and a mobile communication device thereof. The proximity sensor takes the antenna structure as a sensing conductor, which replaces a copper foil of the traditional proximity sensor, and thus the area of the layout design of the mobile communication device can be saved since the individual sensing conductor can be trimmed. Further, the mobile communication device may distinguish whether the approaching object is the human body by observing the relative difference between the proximity sensing signal and different threshold values, so that the mobile communication device can reduce the emitting power of the transceiver only when the user is actually holding the mobile communication device.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A mobile communication device, comprising:
   an antenna structure;
   a matching circuit, coupled to the antenna structure;
   a capacitance sensing circuit, coupled to the matching circuit, wherein the capacitance sensing circuit senses a capacitance variation on the antenna structure via the matching circuit and accordingly generates a proximity sensing signal; and
   a processing circuit, coupled to the capacitance sensing circuit to receive the proximity sensing signal,
   wherein when a signal level of the proximity sensing signal exceeds a first threshold value, an object is determined approaching, and when the signal level of the proximity sensing signal exceeds a second threshold value, a human body is determined approaching, wherein the first and the second threshold value are different.

2. The mobile communication device of claim 1, wherein:
   the processing circuit determines the object is approaching when the signal level of the proximity sensing signal exceeds the first threshold value;
   the processing circuit further determines whether the signal level of the proximity sensing signal exceeds the second threshold value;
   the processing circuit determines the approaching object is not the human body when the signal level of the proximity sensing signal does not exceed the second threshold value; and
   the processing circuit determines the approaching object is the human body when the signal level of the proximity sensing signal exceeds the second threshold value.

3. The mobile communication device of claim 1, further comprising:
   a transceiver, coupled to the matching circuit and providing a wireless communication signal to the antenna structure via the matching circuit, wherein the processing circuit adjusts an emitting power of the transceiver according to the determination result.

4. The mobile communication device of claim 3, wherein the antenna structure is a coupling antenna structure comprising:

a carrier;
a first metal element disposed on the carrier and having a first metal element point; and
a second metal element disposed on the carrier and having a second metal element point, wherein the second metal element and the first metal element are spaced apart by a coupling distance.

5. The mobile communication device of claim 4, wherein the transceiver is connected to the second metal element point and the matching circuit comprises:
   a first capacitor, having a first terminal connected to the first metal element point, and a second terminal connected to a ground plane; and
   a first inductor, having a first terminal connected to the first terminal of the first capacitor, and a second terminal connected to the capacitance sensing circuit, wherein the first capacitor and the first inductor constitute a high pass or a low pass filter.

6. The mobile communication device of claim 4, wherein the matching circuit comprises:
   a first capacitor, having a first terminal connected to the first metal element point, and a second terminal connected to a ground plane;
   a first inductor, having a first terminal connected to the first terminal of the first capacitor, and a second terminal connected to the capacitance sensing circuit, wherein the first capacitor and the first inductor constitute a high pass or a low pass filter;
   a second capacitor, having a first terminal connected to the first terminal of the first capacitor;
   a second inductor, having a first terminal connected to a second terminal of the second capacitor, and a second terminal connected to the ground plane, wherein the first capacitor, the second capacitor and the second inductor constitute a band-pass filter;
   a third capacitor, having a first terminal connected to the second metal element point, and a second terminal connected to the transceiver; and
   a third inductor, having a first terminal connected to the first terminal of the third capacitor, and a second terminal connected to the second terminal of the third capacitor, wherein the third capacitor and the third inductor constitute a band-stop filter.

7. The mobile communication device of claim 4, wherein the matching circuit comprises:
   a first capacitor, having a first terminal connected to the first metal element point, and a second terminal connected to a ground plane;
   a first inductor, having a first terminal connected to the first terminal of the first capacitor, and a second terminal connected to the capacitance sensing circuit, wherein the first capacitor and the first inductor constitute a low pass filter;
   a second inductor, having a first terminal connected to the first terminal of the first capacitor and the first terminal of the first inductor;
   a second capacitor, having a first terminal connected to a second terminal of the second inductor, and a second terminal connected to the ground plane, wherein the first capacitor, the second capacitor and the second inductor constitute a band-stop filter;
   a third capacitor, having a first terminal connected to the second metal element point and the transceiver, and a second terminal connected to the ground plane; and
   a third inductor, having a first terminal connected to the first terminal of the third capacitor, and a second terminal connected to the ground plane, wherein the third capacitor and the third inductor constitute a band-pass filter.

8. The mobile communication device of claim 3, wherein the antenna structure is a planar inverted F-antenna (PIFA) structure comprising:
   a carrier; and
   a metal element disposed on the carrier and having a first branch and a second branch, wherein the first branch has the first metal element point and the second branch has the second metal element point.

9. The mobile communication device of claim 8, wherein the matching circuit comprises:
   a first capacitor, having a first terminal connected to the first metal element point, and a second terminal connected to a ground plane;
   a first inductor, having a first terminal connected to the first terminal of the first capacitor, and a second terminal connected to the capacitance sensing circuit; and
   a feeding capacitor, having a first terminal connected to the second metal element point, and a second terminal connected to the transceiver,
   wherein the first capacitor, the first inductor and the feeding capacitor constitute a high pass or a low pass filter.

10. The mobile communication device of claim 8, wherein the matching circuit comprises:
    a first capacitor, having a first terminal connected to the first metal element point, and a second terminal connected to a ground plane;
    a first inductor, having a first terminal connected to the first terminal of the first capacitor, and a second terminal connected to the capacitance sensing circuit, wherein the first capacitor and the first inductor constitute a high pass or a low pass filter;
    a second capacitor, having a first terminal connected to the first terminal of the first capacitor;
    a second inductor, having a first terminal connected to a second terminal of the second capacitor, and a second terminal connected to the ground plane, wherein the first capacitor, the second capacitor and the second inductor constitute a band-pass filter;
    a third capacitor, having a first terminal connected to the second metal element point;
    a feeding capacitor, having a first terminal connected to a second terminal of the third capacitor, and a second terminal connected to the transceiver; and
    a third inductor, having a first terminal connected to the first terminal of the third capacitor, and a second terminal connected to the second terminal of the third capacitor and the first terminal of the feeding capacitor, wherein the third capacitor, the third inductor and the feeding capacitor constitute a band-stop filter.

11. The mobile communication device of claim 8, wherein the matching circuit comprises:
    a first capacitor, having a first terminal connected to the first metal element point, and a second terminal connected to a ground plane;
    a first inductor, having a first terminal connected to the first terminal of the first capacitor, and a second terminal connected to the capacitance sensing circuit, wherein the first capacitor and the first inductor constitute a low pass filter;
    a second inductor, having a first terminal connected to the first terminal of the first capacitor and the first terminal of the first inductor;

a second capacitor, having a first terminal connected to a second terminal of the second inductor, and a second terminal connected to the ground plane, wherein the first capacitor, the second capacitor and the second inductor constitute a band-stop filter;

a third capacitor, having a first terminal connected to the transceiver, and a second terminal connected to the ground plane;

a feeding capacitor, having a first terminal connected to the second metal element point, and a second terminal connected to the first terminal of the third capacitor and the transceiver; and a third inductor, having a first terminal connected to the first terminal of the third capacitor and the second terminal of the feeding capacitor, and a second terminal connected to the ground plane, wherein the third capacitor, the third inductor and the feeding capacitor constitute a band-pass filter.

12. A proximity sensor suitable for disposing in a mobile communication device, wherein the mobile communication device comprises an antenna structure for receiving or emitting a wireless communication signal, the proximity sensor comprising:

a matching circuit, coupled to the antenna structure; and a capacitance sensing circuit, taking the antenna structure as a sensing conductor to sense a capacitance variation on the antenna structure via the matching circuit and accordingly generate a proximity sensing signal, wherein the proximity sensing signal is transmitted to a processing circuit, wherein a signal level of the proximity sensing signal is calculated, the object is determined to be approaching the mobile communication device when the signal level of the proximity sensing signal exceeds a first threshold value, and the approaching object is determined to be the human body when the signal level of the proximity sensing signal exceeds a second threshold value, wherein the first and the second threshold are different.

13. The proximity sensor of claim 12, wherein the antenna structure is a coupling antenna structure comprising:

a carrier;

a first metal element disposed on the carrier and having a first metal element point; and a second metal element disposed on the carrier and having a second metal element point, wherein the second metal element and the first metal element are spaced apart by a coupling distance.

14. The proximity sensor of claim 13, wherein the wireless communication signal is provided to the second metal element point and the matching circuit comprises:

a first capacitor, having a first terminal connected to the first metal element point, and a second terminal connected to a ground plane; and a first inductor, having a first terminal connected to the first terminal of the first capacitor, and a second terminal connected to the capacitance sensing circuit, wherein the first capacitor and the first inductor constitute a high pass or a low pass filter.

15. The proximity sensor of claim 13, wherein the matching circuit comprises:

a first capacitor, having a first terminal connected to the first metal element point, and a second terminal connected to a ground plane;

a first inductor, having a first terminal connected to the first terminal of the first capacitor, and a second terminal connected to the capacitance sensing circuit, wherein the first capacitor and the first inductor constitute a high pass or a low pass filter;

a second capacitor, having a first terminal connected to the first terminal of the first capacitor;

a second inductor, having a first terminal connected to a second terminal of the second capacitor, and a second terminal connected to the ground plane, wherein the first capacitor, the second capacitor and the second inductor constitute a band-pass filter;

a third capacitor, having a first terminal connected to the second metal element point, and a second terminal received the wireless communication signal; and a third inductor, having a first terminal connected to the first terminal of the third capacitor, and a second terminal connected to the second terminal of the third capacitor, wherein the third capacitor and the third inductor constitute a band-stop filter.

16. The proximity sensor of claim 13, wherein the matching circuit comprises:

a first capacitor, having a first terminal connected to the first metal element point, and a second terminal connected to a ground plane;

a first inductor, having a first terminal connected to the first terminal of the first capacitor, and a second terminal connected to the capacitance sensing circuit, wherein the first capacitor and the first inductor constitute a low pass filter;

a second inductor, having a first terminal connected to the first terminal of the first capacitor and the first terminal of the first inductor;

a second capacitor, having a first terminal connected to a second terminal of the second inductor, and a second terminal connected to the ground plane, wherein the first capacitor, the second capacitor and the second inductor constitute a band-stop filter;

a third capacitor, having a first terminal connected to the second metal element point, and a second terminal connected to the ground plane; and a third inductor, having a first terminal connected to the first terminal of the third capacitor, and a second terminal connected to the ground plane, wherein the third capacitor and the third inductor constitute a band-pass filter.

17. The proximity sensor of claim 12, wherein the antenna structure is a planar inverted F-antenna (PIFA) structure comprising:

a carrier; and a metal element disposed on the carrier and having a first branch and a second branch, wherein the first branch has a first metal element point and the second branch has a second metal element point.

18. The proximity sensor of claim 17, wherein the matching circuit comprises:

a first capacitor, having a first terminal connected to the first metal element point, and a second terminal connected to a ground plane;

a first inductor, having a first terminal connected to the first terminal of the first capacitor, and a second terminal connected to the capacitance sensing circuit; and a feeding capacitor, having a first terminal connected to the second metal element point, and a second terminal received the wireless communication signal, wherein the first capacitor, the first inductor and the feeding capacitor constitute a high pass or a low pass filter.

19. The proximity sensor of claim 17, wherein the matching circuit comprises:

a first capacitor, having a first terminal connected to the first metal element point, and a second terminal connected to a ground plane;

a first inductor, having a first terminal connected to the first terminal of the first capacitor, and a second terminal connected to the capacitance sensing circuit, wherein the first capacitor and the first inductor constitute a high pass or a low pass filter;

a second capacitor, having a first terminal connected to the first terminal of the first capacitor;

a second inductor, having a first terminal connected to a second terminal of the second capacitor, and a second terminal connected to the ground plane, wherein the first capacitor, the second capacitor and the second inductor constitute a band-pass filter;

a third capacitor, having a first terminal connected to the second metal element point;

a feeding capacitor, having a first terminal connected to a second terminal of the third capacitor, and a second terminal received the wireless communication signal; and a third inductor, having a first terminal connected to the first terminal of the third capacitor, and a second terminal connected to the second terminal of the third capacitor and the first terminal of the feeding capacitor, wherein the third capacitor, the third inductor and the feeding capacitor constitute a band-stop filter.

20. The proximity sensor of claim 17, wherein the matching circuit comprises:

a first capacitor, having a first terminal connected to the first metal element point, and a second terminal connected to a ground plane;

a first inductor, having a first terminal connected to the first terminal of the first capacitor, and a second terminal connected to the capacitance sensing circuit, wherein the first capacitor and the first inductor constitute a low pass filter;

a second inductor, having a first terminal connected to the first terminal of the first capacitor and the first terminal of the first inductor;

a second capacitor, having a first terminal connected to a second terminal of the second inductor, and a second terminal connected to the ground plane, wherein the first capacitor, the second capacitor and the second inductor constitute a band-stop filter;

a third capacitor, having a first terminal received the wireless communication signal, and a second terminal connected to the ground plane;

a feeding capacitor, having a first terminal connected to the second metal element point, and a second terminal connected to the first terminal of the third capacitor; and a third inductor, having a first terminal connected to the first terminal of the third capacitor and the second terminal of the feeding capacitor, and a second terminal connected to the ground plane, wherein the third capacitor, the third inductor and the feeding capacitor constitute a band-pass filter.

* * * * *